Figure 13:
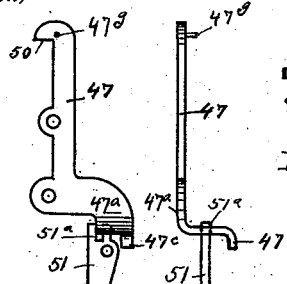

No. 694,322. Patented Feb. 25, 1902.
J. F. OHMER, H. TYLER & W. F. BREIDENBACH.
FARE REGISTER.
(Application filed July 31, 1901.)
(No Model.) 5 Sheets—Sheet 1.

No. 694,322. Patented Feb. 25, 1902.
J. F. OHMER, H. TYLER & W. F. BREIDENBACH.
FARE REGISTER.
(Application filed July 31, 1901.)
(No Model.) 5 Sheets—Sheet 2.
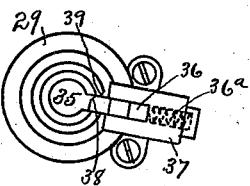
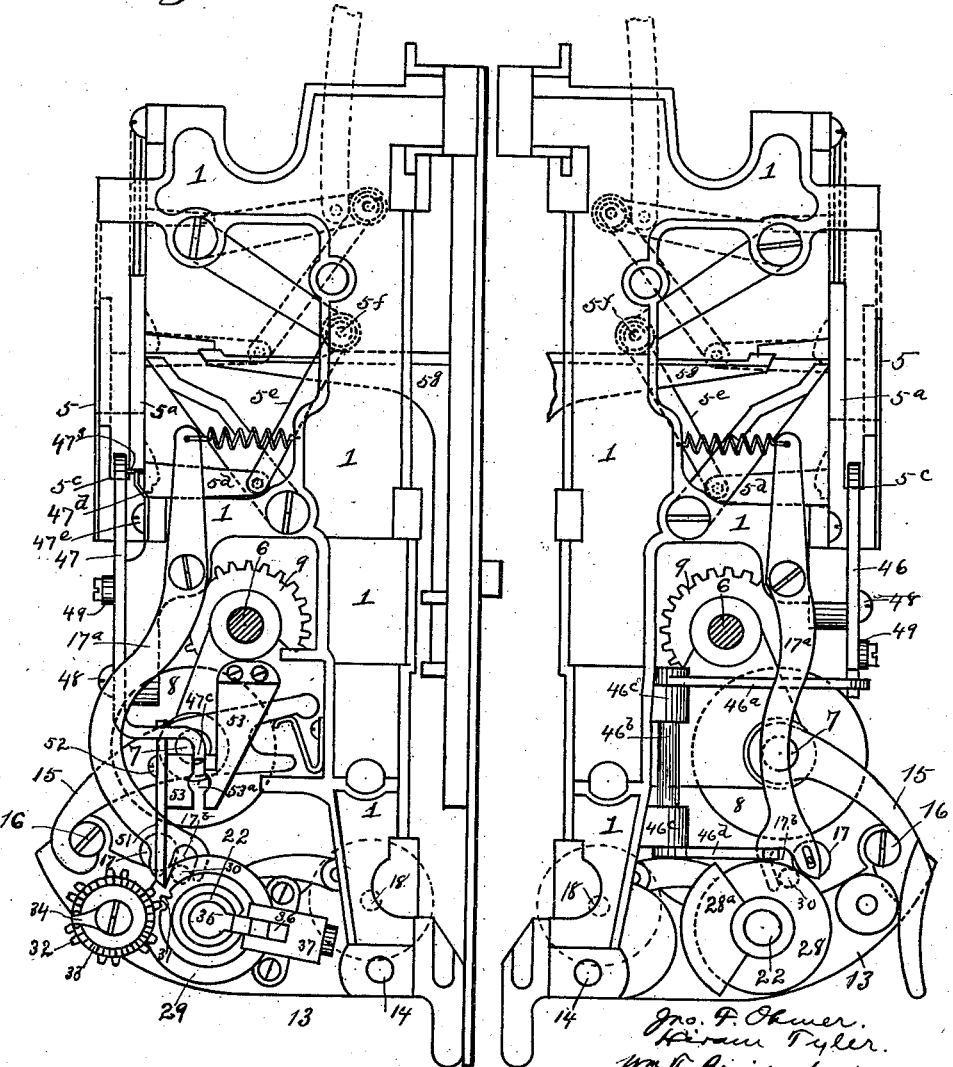

No. 694,322. Patented Feb. 25, 1902.
J. F. OHMER, H. TYLER & W. F. BREIDENBACH.
FARE REGISTER.
(Application filed July 31, 1901.)
(No Model.) 5 Sheets—Sheet 3.
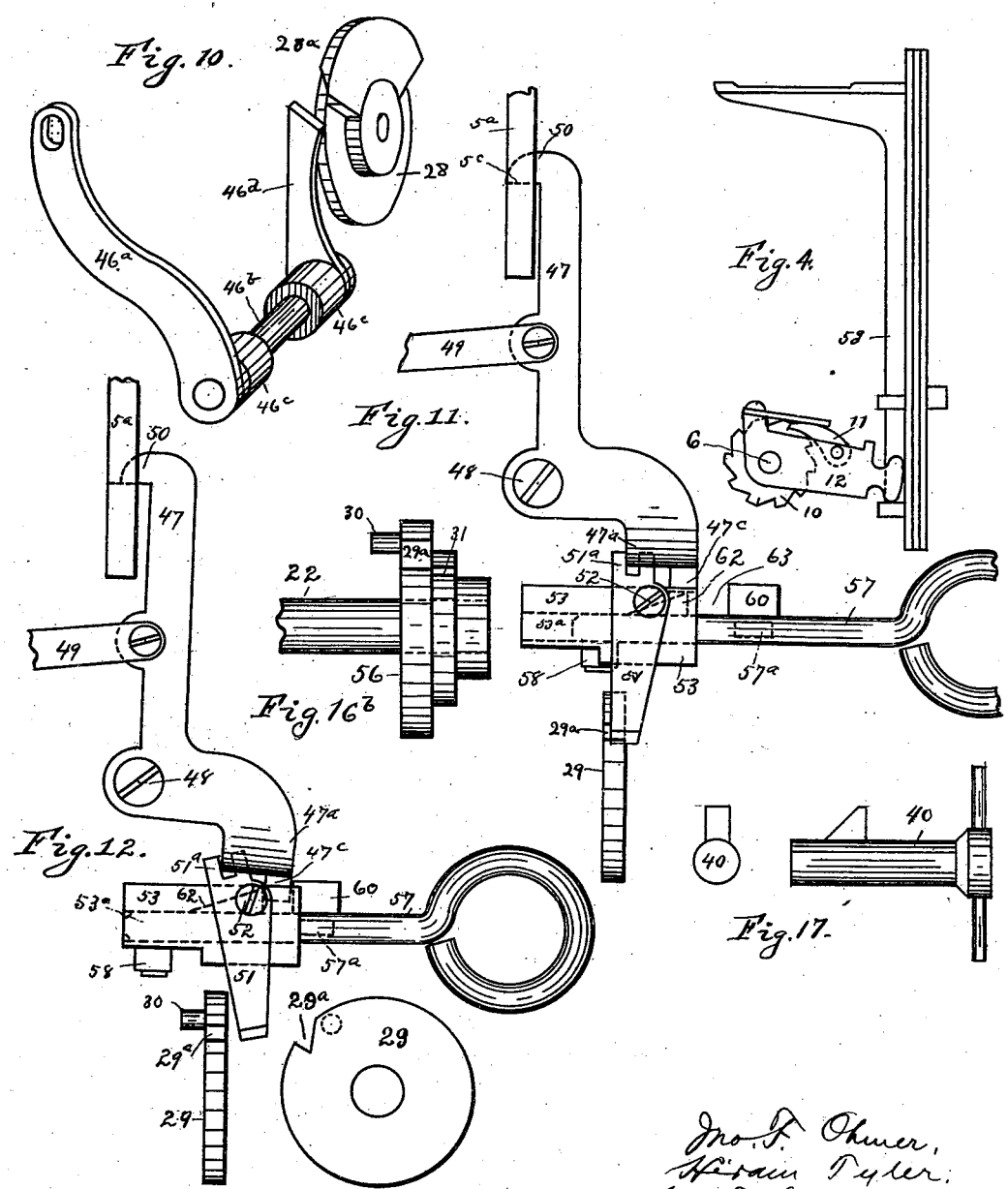
WITNESSES.
C. M. Theobald.
Matthew Siebler.
INVENTORS.
Jno. F. Ohmer,
Hiram Tyler,
Wm. F. Breidenbach.
By R. J. McCarty,
their ATTORNEY.

No. 694,322. Patented Feb. 25, 1902.
J. F. OHMER, H. TYLER & W. F. BREIDENBACH.
FARE REGISTER.
(Application filed July 31, 1901.)
(No Model.) 5 Sheets—Sheet 4.
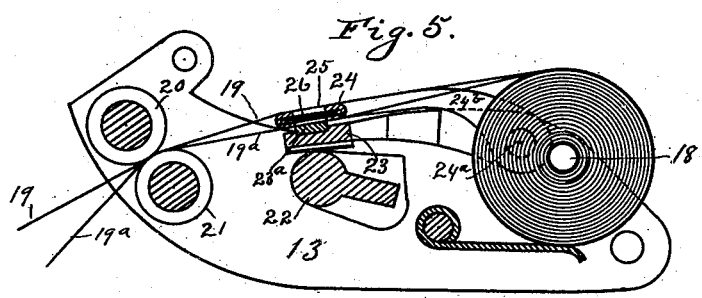
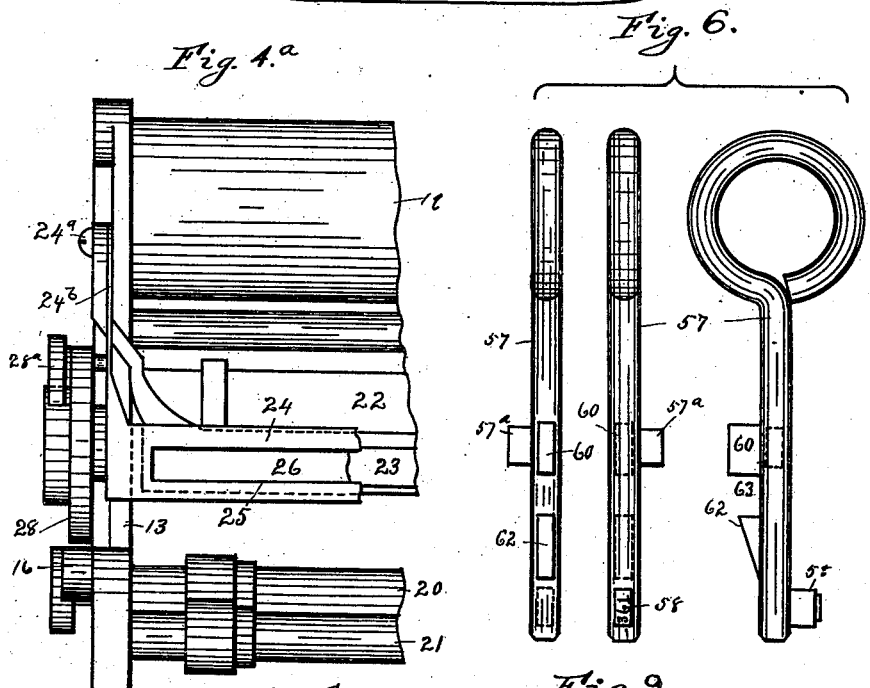
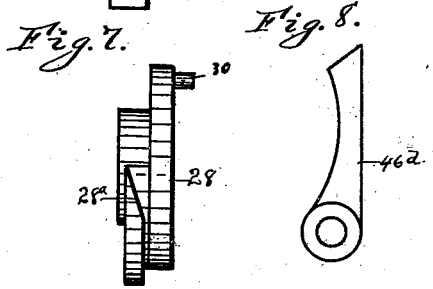
WITNESSES
Matthew Siebler
C. M. Theobald
INVENTORS
Jno. F. Ohmer
Hiram Tyler
Wm. F. Breidenbach
By R. J. McCarty
their ATTORNEY

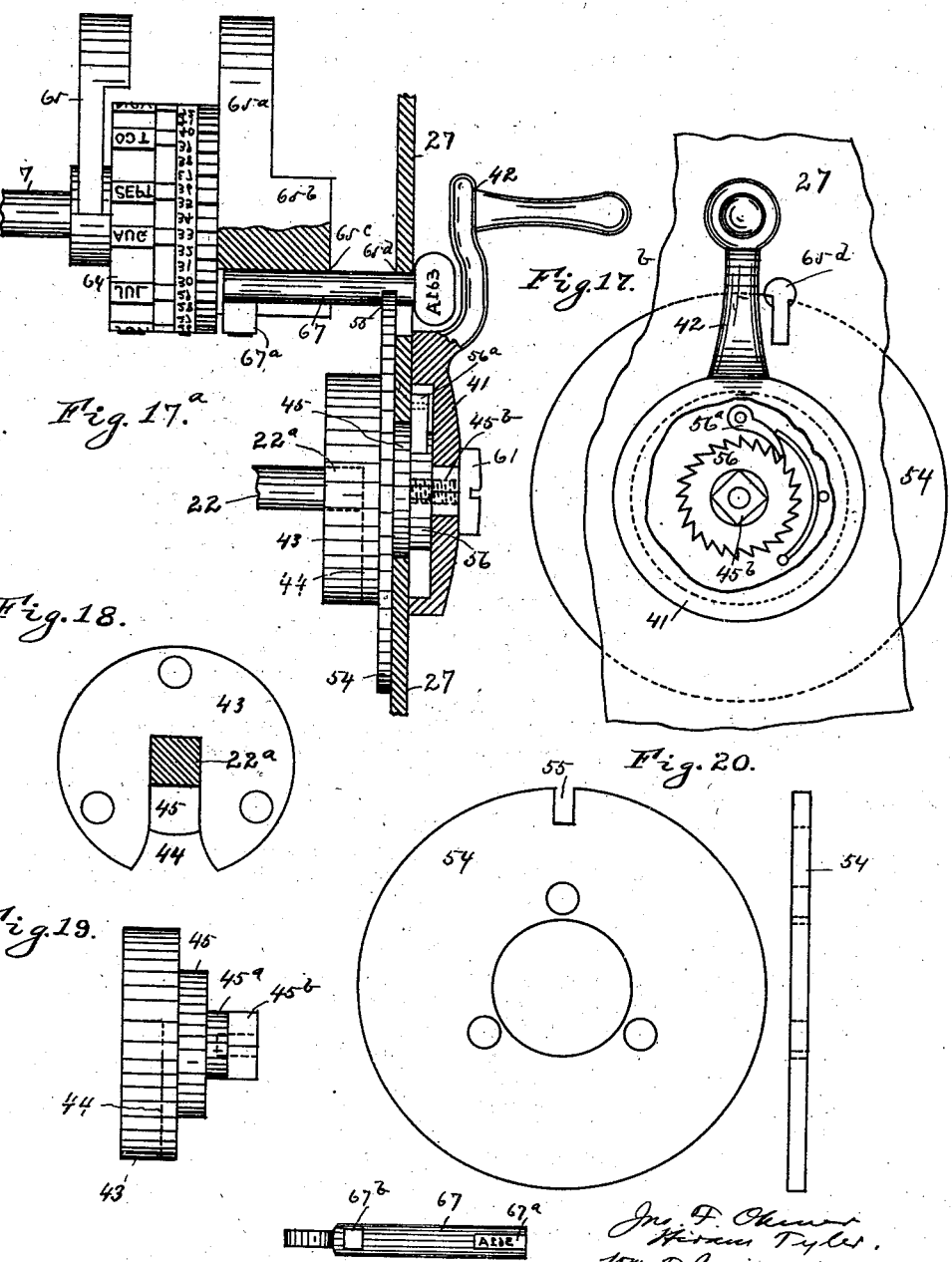

United States Patent Office.

JOHN F. OHMER, HIRAM TYLER, AND WILLIAM F. BREIDENBACH, OF DAYTON, OHIO, ASSIGNORS TO THE OHMER CAR REGISTER COMPANY, OF ROCHESTER, NEW YORK, A CORPORATION.

FARE-REGISTER.

SPECIFICATION forming part of Letters Patent No. 694,322, dated February 25, 1902.

Application filed July 31, 1901. Serial No. 70,420. (No model.)

*To all whom it may concern:*

Be it known that we, JOHN F. OHMER, HIRAM TYLER, and WILLIAM F. BREIDENBACH, citizens of the United States, residing at Dayton, in the county of Montgomery and State of Ohio, have invented certain new and useful Improvements in Fare-Registers; and we do declare the following to be a full, clear, and exact description of the invention, such as will enable others skilled in the art to which it appertains to make and use the same, reference being had to the accompanying drawings, and to the figures of reference marked thereon, which form a part of this specification.

Our invention relates to improvements in fare-registers.

The present application contains subject-matter which is separated from a pending application for Letters Patent for improvements in fare-registers filed by John F. Ohmer and Hiram Tyler March 18, 1901, Serial No. 51,744. In the said pending application means are shown and described for obtaining statements from the registering-wheels at different times, showing in tabulated form the various fares which have been registered therein and indicated.

The present invention comprises means for identifying with each statement so taken the person taking the same, to the end that the person or persons under whose control the register was for any given period of time may be identified with the work or returns of said register for such period or periods. The advantage of this lies in the ability of the company operating the register to fix the responsibility for any irregularity in the returns as compared with the statements taken from the register.

The invention further comprises means for locking the register against operation at such times when it is not under the control of the conductor—for example, when he is temporarily absent from the car—as will more fully hereinafter appear.

So far as we are aware we are the first to provide means in a register for identifying with the statements taken therefrom the person or persons taking such statements. This is a very important feature in the collections of fares in street-cars and other public conveyances, as it at once establishes the identity of the person who has control of the register for any given period with the work of the register for such period. One of the identification-keys is placed in the possession of each conductor or other person having authority over the register with which such key or keys operate. The number or other identification-mark of such key or keys will correspond to the number peculiar to each authorized operator, being the same as that usually shown on the conductor's cap or belt. In short, the present invention, combined with means for taking classified statements from the register, as shown in the pending application hereinbefore referred to, furnishes complete and reliable means for knowing that the company operating the registers is or is not receiving all the earnings of each register in its service.

It will be apparent from the description of our invention that the means for identifying persons with the work of registers are not alone confined to fare-registers, but may be found available for identifying persons with the receipts or transactions of other machines usually employed in commercial places, such as cash-registers or recording-machines. We therefore do not wish to limit the scope of our invention to fare-registers alone.

We are aware that there are in existence machines known as "workmen time-recorders," consisting of clock and other mechanisms and keys which operate therewith to indicate or print the number or mark of each workman, together with the time he enters and leaves the shop; but such means subserves entirely different purposes from the present invention and does not conflict herewith.

Preceding a detailed description of our invention reference is made to the accompanying drawings, of which—

Figures 14, 15:
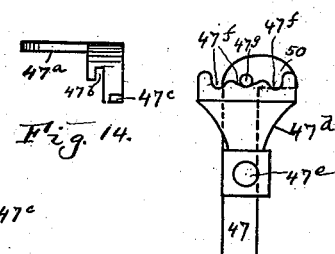
Figure 16:
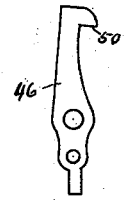
Figure 1:
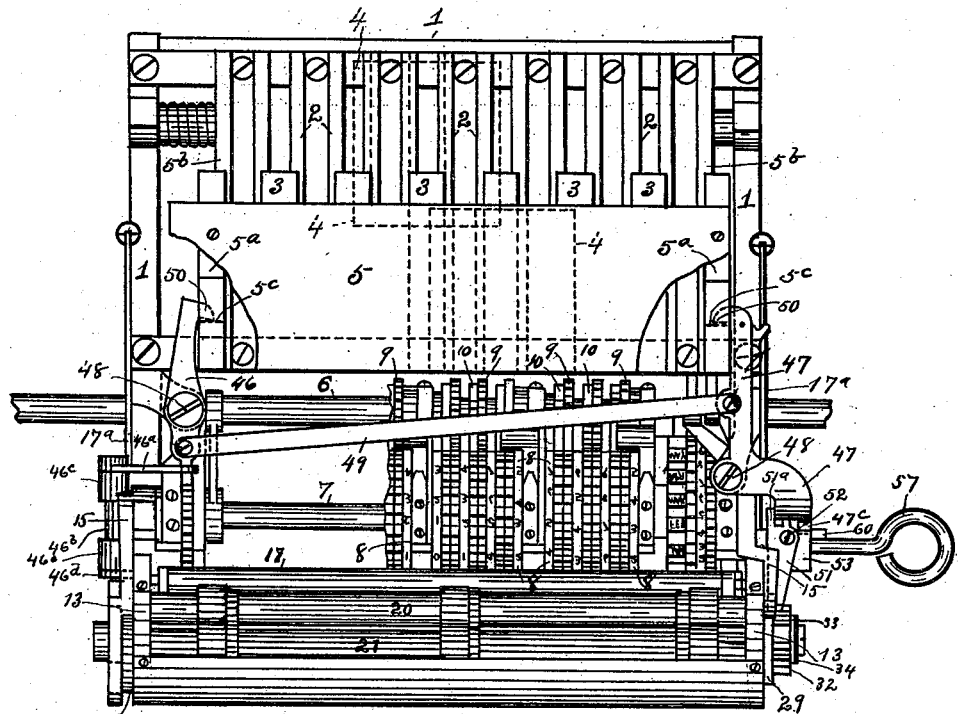

Figure 1 is a front elevation of a fare-register constructed in accordance with our invention, the inclosing case being removed. Figs. 2 and 3 are elevations showing the mechanism from opposite sides; Fig. 4, Sheet 4, a detail of one of the main actuating members; Fig. 4ª, Sheet 3, a plan view of the printing devices, parts broken away; Fig. 5, a sectional view of the printing devices; Fig. 6, different views of the identification-key; Fig. 7, a detail of the unlocking-cam; Fig. 8, a detail of the unlocking-pawl; Fig. 9, a detail of a portion of the unlocking devices; Fig. 10, a detail of the unlocking devices as shown in Figs. 7, 8, and 9 assembled; Figs. 11 and 12, detail views of the unlocking devices and the identification-key by means of which the initial operation of unlocking the register takes place; Fig. 13, detail views of the unlocking devices; Fig. 14, a plan view of the lower end of the upper dog as shown in Fig. 13; Fig. 15, a detail view of the detent, one of the features of the locking devices; Fig. 16, a detail of one of the features of the locking and unlocking devices; Figs. 16ª and 16ᵇ, Sheet 4, details of the locking and unlocking devices; Fig. 17, detail views of the key by means of which the statements are obtained; Fig. 17ª, a partial sectional view of modified means for identifying the statements taken from the register; Fig. 17ᵇ, a front elevation of said modified identification means, the inclosing casing being broken away; Fig. 18, a detail of parts of the modified identification means; Fig. 19, an elevation of Fig. 18; Fig. 20, further details of the modified identification means; Fig. 21, a view of the key operating in connection with the modified identification means; Fig. 22, a detail view of the devices for locking the eccentric bar.

In the following detailed description similar reference characters indicate corresponding parts in the several views of the drawings.

1 designates the several parts of the supporting-frame, the inclosing case of which is not shown.

2 designates a series of vertical guides secured to the frame and in which a similar number of slides or bars 3 are placed and guided in their movements. Connected to these bars 3 is a corresponding number of indicator-cards 4, some of which are represented by the broken lines in Fig. 1. Each of such cards bears an indication denoting a specific class of fares—such, for example, as five-cent fares, three-cent fares, tickets, transfers, &c.

5 designates a vertically-movable plate attached at each end to upright supports 5ª, which are guided in their movements up and down by two end guides 5ᵇ. The sliding supports 5ª have shoulders 5ᶜ in the rear of the plate 5 and two rearwardly-projecting arms 5ᵈ.

5ᵉ designates pivotal links which connect the arms 5ᵈ with an oscillating bar 5ᶠ. This bar 5ᶠ lies across the upper ends of a series of individual members 5ᵍ and is the means by which the plate 5 is actuated, the said bar 5ᶠ being movable by any one of the main actuating members 5ᵍ. The plate 5 lies across the central part of the frame in front of the indicator-cards and is movable simultaneously with each indicator-card upon each operation of the register.

The object and purpose of the plate 5 is to direct the attention of the occupants of a car to the register whenever an incomplete operation of the register occurs. This feature is fully described in the pending application hereinbefore referred to.

6 and 7 are two parallel shafts suitably mounted in the lower portion of the frame.

8 designates detail registering-wheels which are mounted in groups of units, tens, hundreds, and thousands on shaft 7. In Fig. 1 we have shown only two of said groups and a portion of a third group; but it will be understood that there are as many such groups of wheels as there are different denominations of fares. The figures on the peripheries of said wheels are raised in order that impressions or prints may be obtained therefrom. Above said wheels on shaft 6 are mounted the actuating-wheels 9, which are driven from ratchet-wheels 10, engaged by pawls 11. (See Fig. 4.) Pawls 11 are supported on pivotal arms 12, are loosely mounted on shaft 6, and are actuated by their respective operating member 5ᵍ.

13 designates lower side plates hinged to the lower portion of the frame at 14 and held in their upper position, as in Figs. 2 and 3, by arms 15, which are pivotally mounted on shaft 7. When these supporting-plates are in their raised positions, the arms 15 engage at their lower ends with studs 16 on said plates.

18 is a shaft which has two windings of paper 19 and 19ª, the leading ends of which pass out through advancing rollers 20 and 21.

17 is an inking-roller mounted in two depending arms 17ª and adapted to be moved across the face of the type-wheels 8 prior to taking a printed statement from said wheels.

22 designates an eccentric bar, and 23 is a platen movable thereby to take such printed statements.

All of the above-named parts—to wit, the paper-shaft 18, the feed-rollers 20 21, the eccentric bar 22, and the platen 23—are supported on the side plates 13.

All of the various mechanical parts, their arrangement, and construction are fully described in the pending application hereinbefore referred to.

We will now describe different means whereby we are enabled to take duplicate statements from the wheels 8.

24 designates a metallic frame or carbon-sheet holder having a longitudinal opening 25, through which both sides of a carbon-sheet 26 is exposed. The said carbon-sheet holder is pivoted at 24ª to the outer sides of the plates 13 by means of arms 24ᵇ, which project from said holder. (See Figs. 4 and 5.) The leading ends of the paper pass above and below said holder. The platen 23 has a raised portion 23ª of suitable dimensions to permit of its entering the opening 25 in the carbon-sheet holder, so that when the said platen is actuated by the movement of the eccentric bar 22 the paper, with the carbon-sheet between it, will be pressed against the type-wheels 8, and thus a duplicate statement will be obtained from said wheels. It will be understood that when this means for taking statements is employed the inking-roller 17, hereinbefore referred to, may be dispensed with.

28 and 29 are two disks which are filed to the ends of eccentric bar 22. These disks have each a pin 30, which enters a slot $17^b$ in the depending arms $17^a$, and thus impart movement to the ink-roller 17 in the initial movement of the eccentric bar. Disk 29 has a single tooth 31, which engages with a mutilated gear 32, loose on the shaft of feed-roller 21. The mutilated gear 32 has its face provided with ratchets 33, which engage in the rotation of the wheel 32 with a ratchet-plate 34, which is fixed to the end of shaft of roller 21, and thus movement is imparted to the feed-rollers 20 and 21. Disk 29 has a keyhole 35. Coöperating with this keyhole is a locking device for maintaining the eccentric bar 22 in a locked condition, so that it cannot be operated to take an impression from the type-wheels, consisting of a dog 36, which is mounted in a housing 37 on one of the side plates 13. The said dog is normally pressed by a spring $36^a$ and has a tapering surface 38, which matches with a tapering surface 39 on the wheel 29, adjacent to the keyhole. When the key 40 is inserted in said hole, the dog is moved out to bring the said tapering surfaces in such relative positions that enables the disk or wheel 29 to be turned with the key; but said disk cannot be turned in an opposite direction, owing to the lower sharp corners of the dog and the wheel or disk engaging. When pressed out by the spring $36^a$, the dog enters the keyhole, and thus the eccentric bar 22 and the parts operated thereby in taking a printed statement are locked.

The parts thus far described, with the exception of the means for taking the duplicate statements, are fully described in the pending application hereinbefore referred to. The said parts have been herein described somewhat at length, owing to their being more or less closely associated with the parts comprised in the present invention, which will now be described.

46 and 47 designate two dogs which are fulcrumed at 48 to opposite sides of the frame. (See Fig. 1.) 49 is a bar forming a connection between these dogs on opposite sides of the pivots 48—that is to say, the said bar is pivotally connected with dog 46 below its pivot and with dog 47 above the latter's pivot. The purpose of such connections is to enable opposing movements to be simultaneously imparted to said dogs, as will hereinafter more fully appear. The said dogs are mounted in positions that enable their noses 50 at desired times to engage with the shoulders $5^c$ on the supports of the plate 5, and when so engaged, as in Fig. 1, it is obvious that the plate 5 cannot be elevated or operated, and hence the entire mechanism of the register cannot be operated for the time being. Dog 47 has its lower end $47^a$ terminated substantially on the angles shown in Fig. 13, and said end engages with a lower dog 51, which is pivoted at 52 to a side of the keyhole-lug 53, said keyhole-lug being secured in suitable position to enable the identification-key 57 to be placed in a proper position to print with the type-wheels 8. (See Figs. 2, 11, and 12.) Any suitable connection may be made between the dogs 47 and 51. In Figs. 13 and 14 the lower end of dog 47 is shown to have a slot $47^b$ and the adjacent end of dog 51 to have similar slot and projections $51^a$, by means of which a flexible connection is obtained between the two dogs. The extreme lower end of dog 47 has an extension $47^c$, which lies within the upper portion of the keyhole $53^a$. The lower end of dog 51 projects above the disk 29 and is movable in and out of positions to engage with notch $29^a$ therein. When the dogs 47 and 51 are in the positions shown in Fig. 11, the register is locked against operation, dogs 46 and 47 engaging with shoulders $5^c$ on the supports of plate 5 and dog 51 engaging with disk 29 on the eccentric shaft 22. The identification-key 57 is in the act of being inserted in the keyhole $53^a$, as shown in Fig. 11. When said key is inserted to its limit, which is determined by the stop-lug $57^a$, the dog 51 is moved from engagement with disk 29; but it will be seen from Fig. 12 that the dogs 46 and 47 are only partially moved from engagement with the shoulders $5^c$. In this position of dogs 46 and 47 the register cannot be operated, but the eccentric bar 22 can, as the dog 51 permits of this. The key 40 may then be inserted and the eccentric bar turned. This completes the operation of unlocking the register, moving the dogs 46 and 47 entirely away from the shoulders $5^c$. Before referring further to the operation of the eccentric bar, which thus completes the unlocking operation, the identification-key 57 and its manipulation will be further described. Each conductor or other person who is in charge of a register is given one of these keys bearing a mark or type 58, by which he is identified therewith.

60 and 62 are the locking and unlocking lugs, respectively. In placing the key in the hole lug 60 comes against the projecting end $47^c$ of dog 47 and moves said dog on its pivot from the position shown in Fig. 11 to that shown in Fig. 12. The position of the dog 51 is likewise moved or changed from that shown in Fig. 11 to that shown in Fig. 12. The key 40 may then be inserted, as hereinbefore specified, and the eccentric bar 22 turned. On the opposite end of the eccentric bar 22 there is placed a fixed disk 28, which has a cam $28^a$. Dog 46 is located above said cam and has its lower end connected to a horizontal link $46^a$, which in turn is rigidly connected to a vertical shaft 46$^b$, said shaft being loosely mounted in lugs 46$^c$, projecting from the frame. Upon the lower end of shaft 46$^b$ there is fixed a pawl 46$^d$, which is tripped by the cam 28$^a$ to throw outwardly the dog 46, and as the connecting-bar 49 is attached to said dog below the pivotal point thereof it will be seen that both dogs 46 and 47 will be given opposing or outward movements to release the shoulders 5$^c$, and thus the final unlocking movement is effected.

It will be understood that the identification-key 57 is normally within the keyhole, as shown in Fig. 12, during which time the register may be operated and statements may be taken therefrom showing the amount of the different fares registered up to that time and the identification-mark of the conductor under whose charge the register was during such period of work. The identification-key is removed only when it is desired to lock the machine. This locking operation is done by withdrawing the key. In so doing the lug 62 catches the projecting end 47$^c$ and moves said dog 47 and the opposite dog 46 to the locking positions shown in Fig. 1. The arc movements of the dog 47 are sufficient to permit the highest part of key-lug 62 to pass out and in beneath the projecting end 47$^c$ of the dog. The inclined surface of key-lug 62 enables the key to be inserted without any obstruction from the projecting end 47$^c$. When the said key is inserted to its full limit, as in Fig. 12, the projection 47$^c$ enters the space 63 between the lugs, said space being sufficient to permit of the necessary movements of the dog 47 in completing the unlocking operation. Means are provided for holding the dogs 46 and 47 against any vibrations or movements upon their pivots which might be caused by the motion of the car. These means consist of a plate-spring 47$^d$, which is secured at 47$^e$ to the rear of the frame and in the rear of the dog 47. (See Figs. 1, 2, and 15.) The upper end of this plate has notches 47$^f$, into which a pin 47$^g$ lies, said pin being projected from the upper rear side of dog 47. In either of the three positions of said dog said pin will lie in one or the other of said notches, and the dogs will be thereby held against vibrations. Two of the three positions referred to are shown in Figs. 11 and 12. The third position of the dogs, it will be understood, is the unlocked position accomplished through the devices shown in Fig. 10.

We will next describe the modified locking and identification means shown on Sheet 5 of the drawings.

On the outside of casing 27 there is mounted a rotatable housing 41, which has a crank portion 42, by which it is rotated.

43 is a disk, which has a slot 44 extending from its axis to the rim. This disk has reduced annular extensions 45, 45$^a$, and 45$^b$, the last-named being rectangular or square in cross-section. Mounted on extension 45 there is a larger disk 54, which is fixed to disk 43, said disk 54 having a slot 55 in its rim. The outer portion of extension 45, which is not occupied by this disk 54, has a bearing in the casing 27.

56 designates a ratchet-wheel rigid on extension 45$^a$ and inclosed within the housing 41. The housing has a square opening, which fits over the extension 45$^b$ and is secured by a screw 61. It will be seen that the parts 43, 54, the ratchet-wheel 56, and the housing 41 will all rotate together in the bearing in case 27. The ratchet-wheel 56 is held against back movement by a detent 56$^a$. In the application of these modified means the end of the eccentric bar 22 has a square terminal 22$^a$, which when the said bar is lowered and elevated out of and into its normal position, as shown in Figs. 17$^a$ and 18, moves through the slot 44 in disk 43. Such movements take place through the lowering and raising of the side plates 13. The movement of the eccentric bar 22 in taking a printed statement takes place simultaneously with the operation of turning the crank 42. In Fig. 17$^a$ we have shown adjacent type-wheels 64, which are on shaft 7 with the wheels 8. Two end bearings 65 65$^a$ for said shaft are also shown. The type-wheels 64 in the present instance print the month and date on the statements taken from the wheels 8. Bearing 65$^a$ has a hub 65$^b$, which is provided with a keyhole 65$^c$, in line with which there is another keyhole 65$^d$ in the casing. 67 is an identification-key having a printing-mark on its lug 67$^a$, which identifies the conductor or other person with the statements in a manner hereinbefore specified. In the present instance the identification-mark is "A163." When the key is inserted, the printing-surface thereon comes in alinement with the surface of the type-wheels 64, and an impression thereof is obtained. The keyhole 65$^d$ in the casing lies on one side of the crank 42, as shown in Fig. 17$^b$. The key-slot 55 in disk 54 normally stands in line with the lower portion of the keyhole 65$^d$. With the disk in this position and the crank 42 in its normal position, as in Fig. 17$^a$, the key may be inserted. The said disk and crank, as well as the other parts movable therewith, cannot be operated until the key is placed in a position to print, as in Fig. 17$^b$. This is owing to the notch 55 engaging with the key in any attempt to turn the crank; but when the key is inserted its full length a notch 67$^b$ in the lower side thereof comes in a position in line with said disk, at which time said disk may be rotated by turning the crank. The rim of the disk will then pass through the slot 67$^b$. The impression may thus be taken.

Having described our invention, we claim—

1. In a register, a series of register-wheels, means for moving said wheels at each registration, a key bearing a number or other mark of identification, and means for taking printed or impressed statements from said wheels and said key, the said statements showing the work of the register and the identification-mark of the person taking such statements.

2. In a fare-register, the combination of type-wheels upon which is registered the work of said register, a key bearing an identification-mark adapted to be placed in alinement with said type-wheels, and impression devices adapted to press one or more sheets against said type-wheels and said identification-mark on said key, and whereby an impression or print is obtained showing the work of the register and the identification of the person taking such statement.

3. In a fare-register, the combination of type-wheels by means of which the various fares collected are registered, a key bearing an identification-mark, means for supporting said key in alinement with said type-wheels, and means for taking a statement from said type-wheels and said key, the statement being identified with the person taking the same by means of said identification-key.

4. In a fare-register, the combination of type-wheels upon which the collections of fares are registered, a key bearing an identification-mark which is adapted to be placed in printing alinement with the type-wheels, and means for taking statements from said wheels and key showing the different fares collected and the person taking such statement.

5. In a register, the combination with type-wheels for registering the fares collected, printing or impression devices, a key controlling such printing or impression devices, said key having an identification-mark which is adapted to be placed in alinement with the type-wheels, and whereby means are afforded for identifying with each statement taken from the register, the person taking the same.

6. In a fare-register, the combination with type-wheels upon which the various fares collected are registered, of a key bearing an identification-mark adapted to be placed in alinement with said type-wheels, printing or impression devices for taking statements from said wheels and key, said statements showing the various fares collected and the person taking the statements, and mechanism for locking said register, the said locking mechanism under the control of the identification-key.

7. In a fare-register, the combination with type-wheels which register the various fares collected, devices for taking statements from said type-wheels, and means for locking said devices so that they may not be operated, of means for indentifying the person taking such statements therewith, the said identification means controlling the locking mechanism for the devices through which the statements are taken.

8. In a fare-register, the combination with type-wheels upon which are registered the various fares collected, printing or impression devices through which statements are taken from said wheels, of an identification-key by means of which the person taking such statements is identified therewith, and locking mechanism under the control of such identification-key and whereby the printing or impression devices may be actuated to take an impression or print when said identification-key is placed in printing alinement with the type-wheels.

9. In a fare-register, the combination with type-wheels to register the various fares collected, printing or impression devices through which statements are taken from said wheels, and means for locking said printing or impression devices against operation, of an identification-key, means under the control of said identification-key whereby the register is locked against operation when said key is not in a position to print.

10. In a fare-register, the combination with type-wheels which register the various fares collected, printing or impression devices by means of which statements are obtained from said type-wheels, of an identification-key by means of which the person taking such statements is identified therewith, means for locking the register against operations at desired times, said means being under the control of the identifying-key, and means for locking the printing or impression devices against operation, said last-named means being under the control of the locking mechanism which is controlled by the identification-key.

11. In a register, the combination of groups of register-wheels, means for moving the wheels of each group at each registration, a key bearing a number or other mark of identification, and means for taking impressed or printed statements from said wheels and said key, whereby the work of the register is ascertained, and the person taking each statement is identified therewith.

12. In a fare-register, the combination with a series of groups of register-wheels, and means for moving the wheels of each group upon each registration, of means for taking statements from said wheels, a key bearing an identification-mark by which the person taking such statements is identified therewith, and means for supporting said key in printing alinement with the type-wheels.

13. In a register, the combination with register-wheels upon which the transactions of a register are recorded, means for moving said wheels at each registration, means for taking statements from said wheels, an identification device adapted to be placed in a position to print simultaneously with the statements taken from said wheels, said identification device being also adapted to place the register in an operative condition when it is inserted therein.

14. In a fare-register, the combination with register-wheels arranged in groups and upon which the various transactions of the register are recorded, means for moving said wheels at each registration, of a pressure-bar, means for actuating said pressure-bar, and a printingkey by means of which an operative relation is established between said pressure-bar and the means for actuating said pressure-bar, said key having an identification-mark which is placed in line with the printing-surfaces of the wheels when said key is inserted in a position which establishes the operative relation between the pressure-bar and its actuating mechanism.

In testimony whereof we affix our signatures in presence of two witnesses.

JOHN F. OHMER.
HIRAM TYLER.
WILLIAM F. BREIDENBACH.

Witnesses:
R. J. McCARTY,
M. SIEBLER.